May 20, 1952        J. W. ROWAN        2,597,821
EARTHWORKING ATTACHMENT FOR CULTIVATORS
Filed Feb. 3, 1947        2 SHEETS—SHEET 1
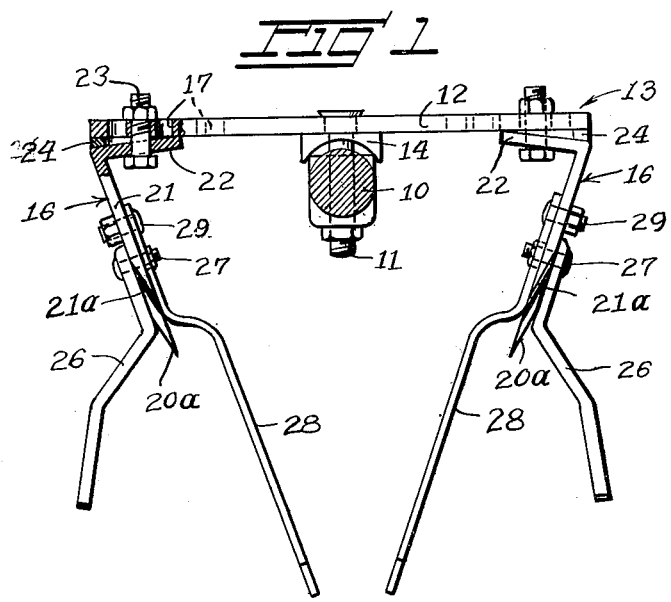
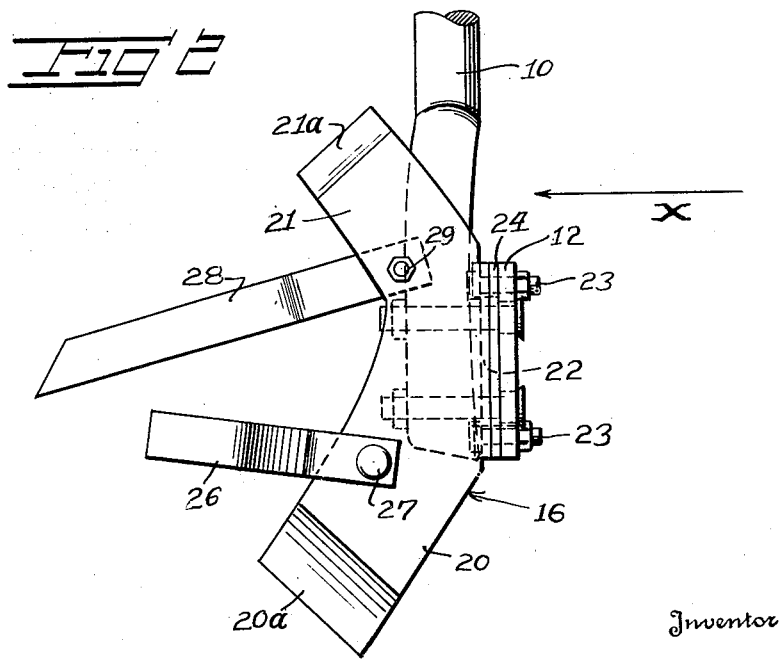
Inventor
*James Walter Rowan*
By *Wilfred E. Lawson*
Attorney

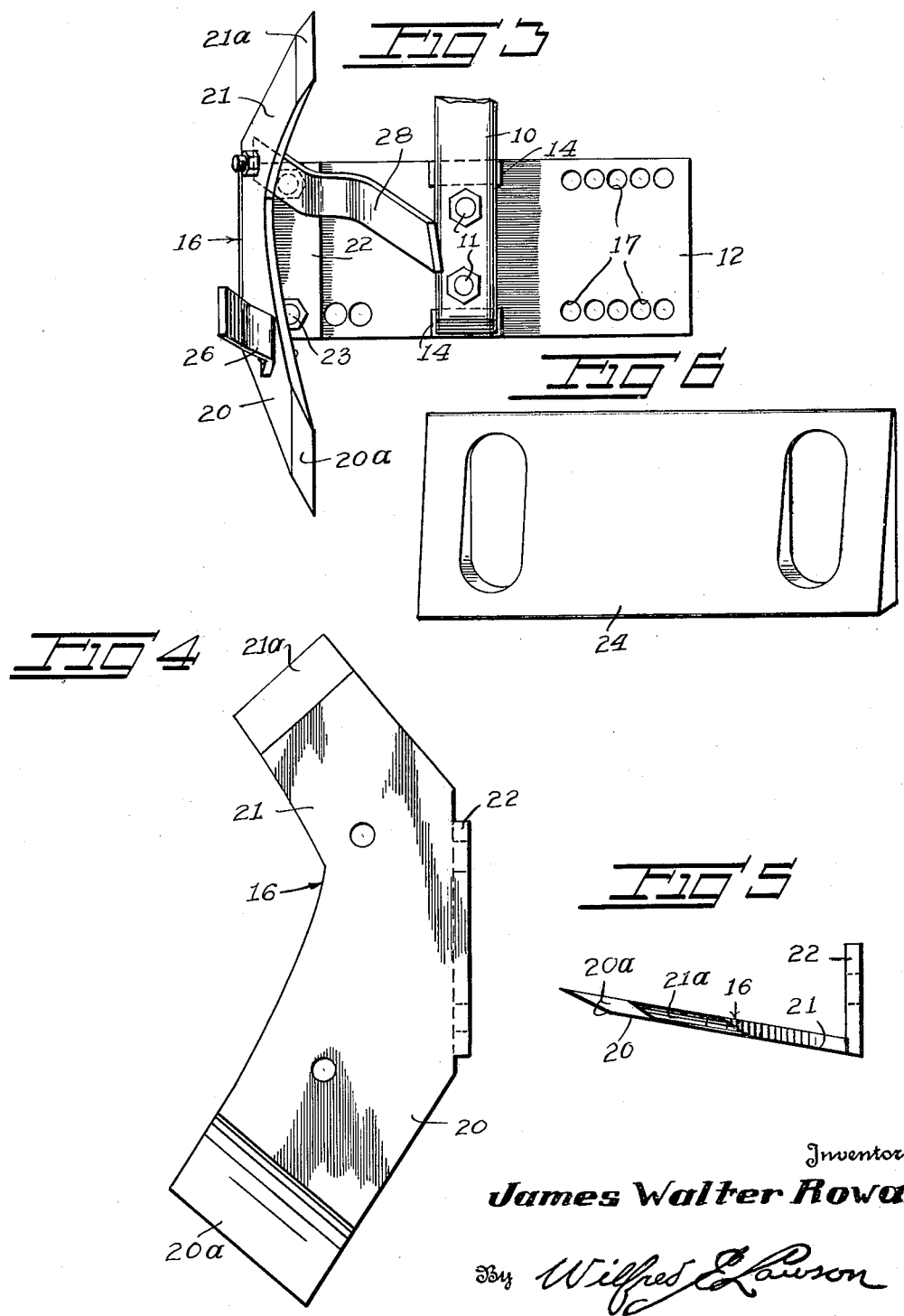

Patented May 20, 1952

2,597,821

UNITED STATES PATENT OFFICE 2,597,821

EARTHWORKING ATTACHMENT FOR CULTIVATORS

James Walter Rowan, Bakersfield, Calif.

Application February 3, 1947, Serial No. 725,988

3 Claims. (Cl. 97—206)

This invention relates to a crust cutter as an implement for attachment on a cultivator, and by means of which the crusted soil can be cut, in which cotton or other seed have already been planted, but not yet broken thru. This cutter implement is intended for use after the cultivation and planting of the soil and subsequent moistening by rain, but before the shoots or sprouts have shown above the ground. By this means the soil is loosened above the seed to facilitate the coming thru of the shoots.

This cutter attachment consists of blades adjustable for light or heavy crust, and of narrow fingers for loosening central crust, as well as of guide bars for lister furrows. This attachment is also provided with means for adjustment to the width of a furrow, of the cutters on the cultivator shank or foot piece, on which it is mounted.

These and other objects and advantages of my invention of the crust cutter, will become evident from the subjoined description aided by the attached drawings.

Like numerals relate to the same details in the different views of the drawing, wherein:

Figure 1 is a top plan view of the cutter attachment, as applied on the depending cultivator shank;

Figure 2 is a left side elevation of the cutter attachment as seen from the right end of Figure 1;

Figure 3 is a front view of the cutter attachment with one blade removed;

Figure 4 is a detail view of a two armed cutter blade;

Figure 5 is a top plan view of Figure 4;

Figure 6 is a perspective view of a wedge plate or filler.

One embodiment of the invention is described and illustrated in the drawings wherein a shank or foot piece of a conventional cultivator is denoted by reference numeral 10, and upon the same is secured the crust cutter 13 as by thrubolts 11 engaging in square holes of its flat cross plate 12 rigidly securing the crust cutter 13 thereon.

A cross plate 12 has a heel 14, near its top and bottom edges and shaped to fit over said cultivator shank or foot 10, and secured by said bolts.

In order to firmly secure a cutter blade 16, one on each end of the cross bar or plate 12, the latter is provided with a series of bolt holes 17 adjacent its top and bottom edges at both ends. In this manner said blades 16 can be secured in front of the cross plate 12 closer together or further apart according to the width of the furrow to be cut in the soil, and by means of other bolts 23.

Each of the cutter blades 16, as best seen in Figures 4 and 5, consists of the blade proper, which is thin and flat with a long arm 20 and a short arm 21, set at an angle to each other, and bent forwardly from a mounting flange 22 which projects towards the centerline of the cross plate 12 at substantially right angles from the main plane of the blade 16.

The blades 16 are adjustable, not only up and down on said cross bar 12, but also angularly to its front surface by means of the bolts 23 and the insertion of filler pieces or wedges 24 between said flange 22, and the cross plate 12, see Figures 1 and 6, to conform to the slope of the furrow sides.

The cutting edges of the blade arms 20, 21 are sharpened to a plow share edge 20a, 21a respectively. As seen in Figure 2, the cutter blades 16 are set with the long arm 20 downwards for deep cutting of the crust, while the short arm 21 is pointing upwards, being idle at the time. The short arm 21 is preferably narrower than the long arm 20 of the blades.

The crust cutter when in use advances with the cultivator in the direction indicated by the arrow X in Figure 2.

On the outer face of the blade-arm 20 is secured a short guide bar 26 of narrow band iron and shown with a blunt nose end, serving for shaping a lister furrow. This guide bar 26 is directed outwardly from the center line of the cultivator and slightly upwardly, as seen in Figures 1 and 2, and is secured by a bolt 27 in a square hole thru arm 20. A similar guide bar 26 is also furnished for the right hand blade. These lister bars 26 are removable if no lister furrow is wanted.

On the inner face of the short arm 21 of the left cutter blade 16 is secured a sharp-pointed finger 28 for cutting the central top crust of the soil above the planted seeds. This finger, also made of band iron or steel, is removably secured by a bolt 29, and points downwardly and inwardly towards the center of the furrow. This is indicated in Figures 1 and 2. Similarly another finger 28 is also provided for the right hand blade 16.

In this manner the complete crust cutter consists of a pair of inwardly and forwardly pointing blades 16 with a pair of crust loosening fingers 28 pointing in the same direction and a pair of lister bars 26 pointing upwardly and outwardly, or in other words the two blades 16 together with parts 26 and 28 are arranged symmetrically on both sides of a central vertical plane of the cultivator.

When a shallower cut is desired all that need be done, is to detach the cross bar 12 by removing the bolts 23 and reverse its position together with the two blades 16, so that the long arms 20 point upwardly and the short arms 21 of the blades 16 point downwardly and then again secure the complete cutter upside down to that showing in Figure 2 by means of the same bolts 23.

It is to be understood that the invention as herein disclosed may be varied from the details described and shown without departure from the spirit of the subjoined claims.

I claim:

1. An earth working attachment for cultivators, comprising an elongated, flat, relatively thin, metal plate formed to provide forwardly divergent blades, each of a different length and width and having the free ends squared and sharpened to provide cutting edges, the rear edge of said plate being straight, a flange bent at right angles from said straight edge, and a second earth working element angularly offset from each of said blades and projecting forwardly therefrom, said elements acting to break the earth crust on both sides of the line of break made by the blade on which it is mounted.

2. The invention as defined in claim 1, with the said plate vertically disposed and the upper of said blades made narrower and shorter than the lower one.

3. The invention as defined in claim 1, with the said plate vertically disposed and the said earth working elements constituting a pair of elongated forwardly directed bars detachably mounted on said plate, one bar above and the other bar below the transverse center of the plate, said one bar being appreciably longer than the other, said bars being oppositely vertically inclined and diverging from the plane of the plate on opposite sides thereof.

JAMES WALTER ROWAN.

REFERENCES CITED

The following references are of record in the file of this patent:

UNITED STATES PATENTS

| Number | Name | Date |
|---|---|---|
| 496,538 | Rawls | May 2, 1893 |
| 634,158 | Williams | Oct. 3, 1899 |
| 791,623 | Holmes | June 6, 1905 |
| 918,298 | Dunlap | Apr. 13, 1909 |
| 1,182,451 | Bradley | May 9, 1916 |
| 1,531,643 | Brewer | Mar. 31, 1925 |
| 1,842,268 | Holmgren | Jan. 19, 1932 |
| 2,022,297 | Nielsen | Nov. 26, 1935 |

FOREIGN PATENTS

| Number | Country | Date |
|---|---|---|
| 2,837 | Great Britain | of 1885 |
| 319,899 | France | Aug. 4, 1902 |
| 595,873 | Germany | Apr. 23, 1924 |